May 22, 1962 J. E. FERCH 3,035,682
HOPPER FOR AUGER CONVEYORS
Filed Feb. 10, 1960 3 Sheets-Sheet 1

James E. Ferch
INVENTOR.

BY Clarence A. O'Brien
and Harvey B. Jacobson
Attorneys

May 22, 1962 J. E. FERCH 3,035,682
HOPPER FOR AUGER CONVEYORS
Filed Feb. 10, 1960 3 Sheets-Sheet 2
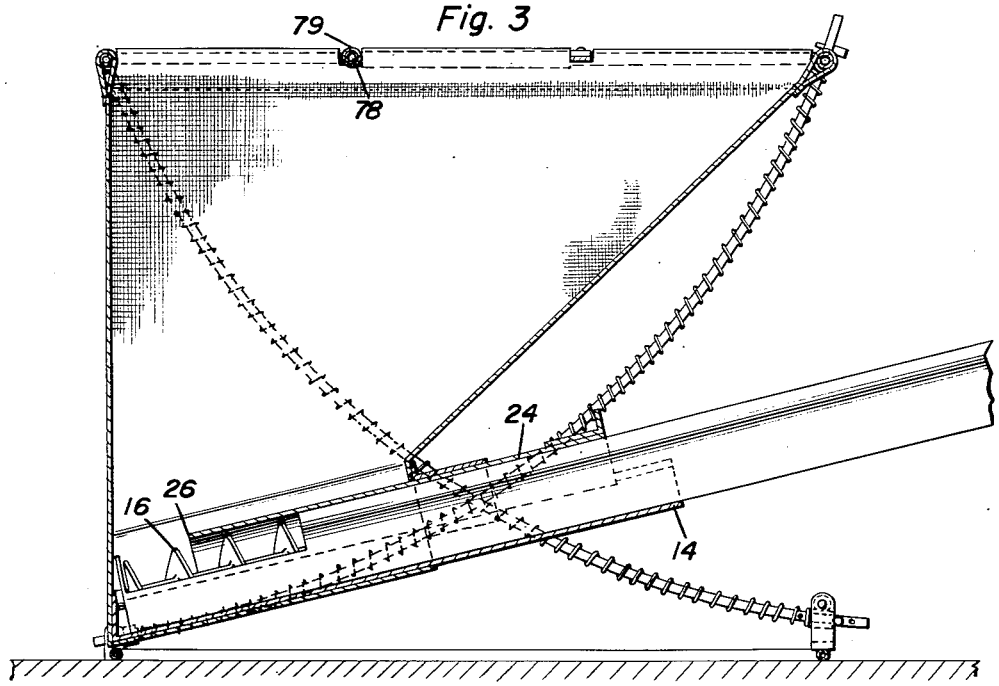
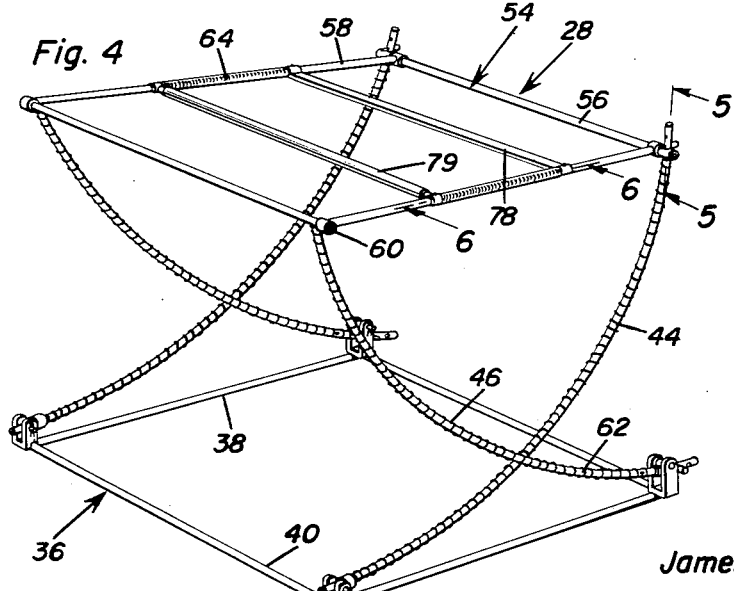
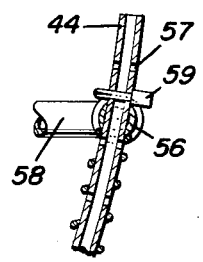
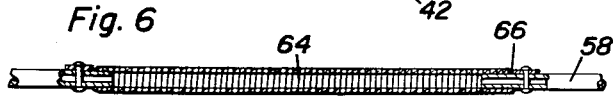
James E. Ferch
INVENTOR.

May 22, 1962  J. E. FERCH  3,035,682
HOPPER FOR AUGER CONVEYORS
Filed Feb. 10, 1960  3 Sheets-Sheet 3
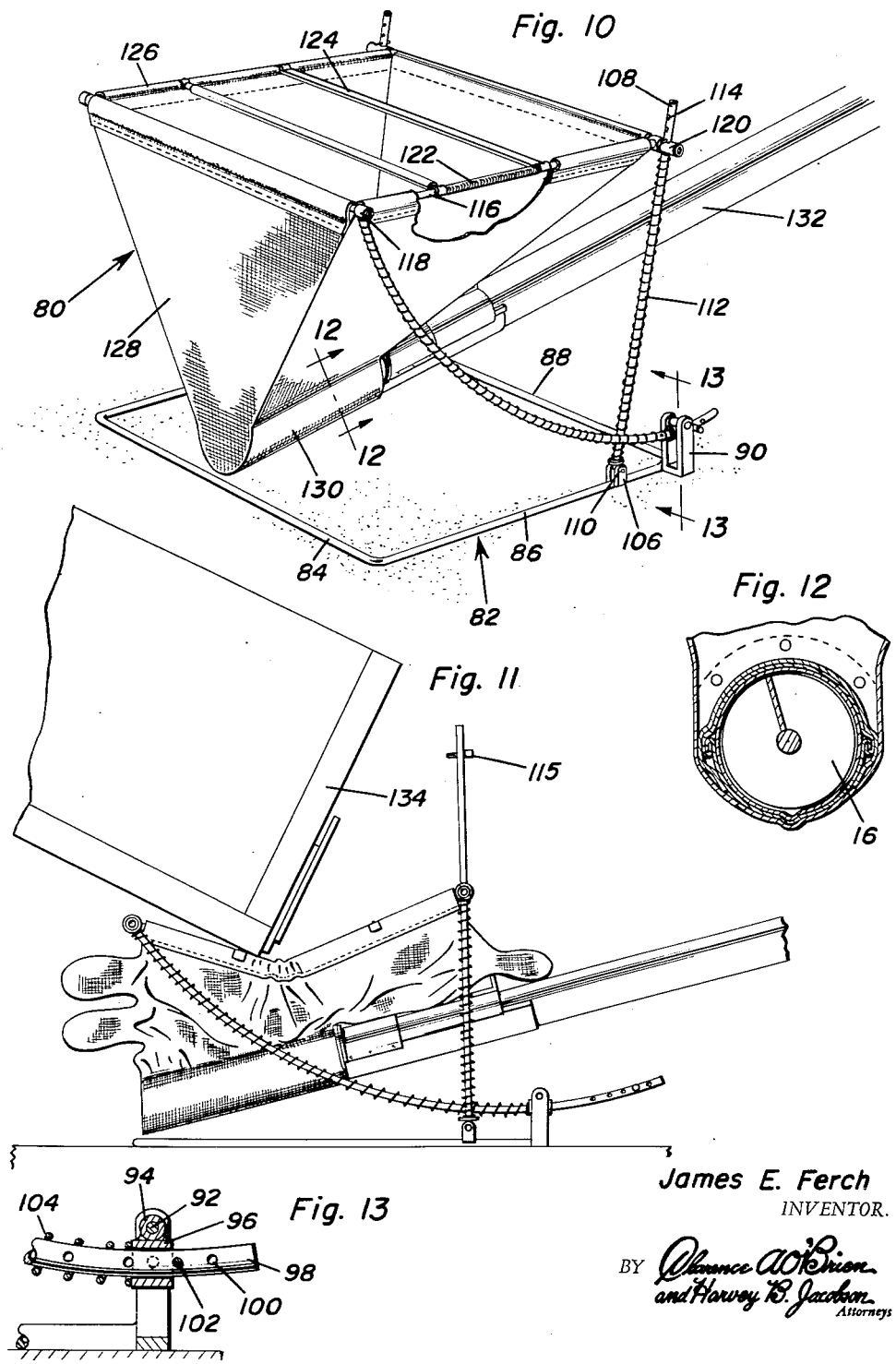
James E. Ferch
INVENTOR.

United States Patent Office 3,035,682
Patented May 22, 1962

3,035,682
HOPPER FOR AUGER CONVEYORS
James E. Ferch, Whitlash, county of Liberty, Mont.
Filed Feb. 10, 1960, Ser. No. 7,898
6 Claims. (Cl. 198—64)

The present invention generally relates to a hopper construction and more particularly to a hopper for screw auger conveyors such as are normally employed for conveying grain, the hopper being constructed of flexible material and including a flexible frame assembly that enables partial collapse of the hopper in response to application of pressure to the hopper thereby enabling the hopper to be employed effectively for receiving grain or similar material from a dump truck body and causing such material to be guided into the screw conveyor with the flexibility of the hopper and hopper frame enabling the hopper to be partially compressed and distorted by the dump body during the dumping operation.

The use of screw auger grain conveyors or elevators is quite prevalent in many farm operations. For example, such a conveyor may be employed for conveying grain into a bin with the material being conveyed from the harvesting machine to the screw auger conveyor by a dump body vehicle such as a dump truck or dump trailer so that the grain may be dumped into the hopper and conveyed into a storage bin by the screw auger. Since it is desirable that the hopper for the screw auger be disposed as closely adjacent the dump body as possible, quite often, the dump body will come into contact with the hopper which will cause the hopper to be bent or otherwise distorted due to downward arcuate movement of the rear end of the dump body when it is moved to a dumping position. Therefore, it is the primary object of the present invention to provide an improved and novel hopper construction in which the hopper itself is constructed of flexible material and including a hopper frame having resilient components for retaining the flexible material in extended position and for enabling the flexible material to be flexed at a depth to receive material from a dump body and guide it into the screw auger while in various positions.

Another object of the present invention is to provide a screw auger conveyor having a framework including resilient flexible structural elements which supports the flexible elements or panels in an open condition for receiving grain from a body but yet permits the movement of the frame of the hopper to a depressed or partially depressed condition.

Other objects of the present invention will reside in the simplicity of construction, efficiency of operation, effectiveness of the solution of the problem involved and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a longitudinal, sectional view taken substantially upon a plane passing along section line 3—3 of FIGURE 1 illustrating further structural details of the invention;

FIGURE 4 is a perspective view of the framework without the flexible hopper attached thereto;

FIGURE 5 is a detailed sectional view taken substantially upon a plane passing along section line 5—5 of FIGURE 4 illustrating one of the adjustment features of the invention;

FIGURE 6 is a longitudinal, sectional view taken substantially upon a plane passing along section line 6—6 of FIGURE 4 illustrating the details of this connection;

FIGURE 10 is a perspective view with portions broken away of a modified form of hopper and supporting frame;

FIGURE 11 is a side elevational view of the construction of FIGURE 10 illustrating the same in collapsed condition;

FIGURE 12 is a detailed sectional view taken substantially upon a plane passing along section line 12—12 of FIGURE 10 illustrating the structural details of this form of the invention; and FIGURE 13 is a detailed sectional view taken substantially upon a plane passing along section line 13—13 of FIGURE 10 and illustrating the construction of the guide loop for one of the arcuate rods.

Figure 1:
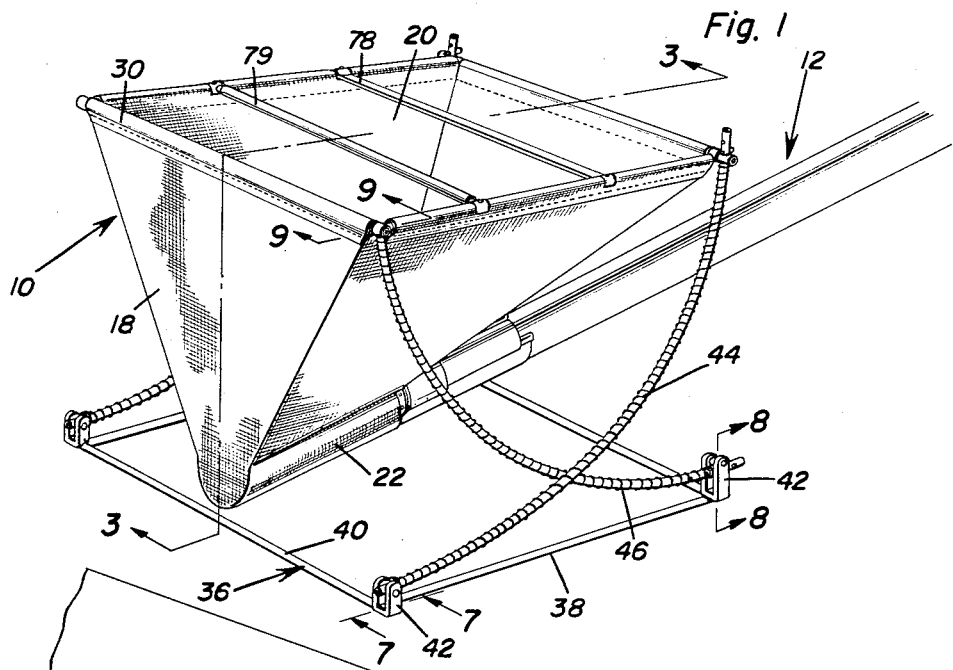
FIGURE 1 is a perspective view of the hopper and screw auger assembly forming the present invention.

Referring now specifically to FIGURES 1–9, the numeral 10 generally designates the hopper of the present invention for use with grain conveyors generally designated by numeral 12 which includes a tubular pipe 14 having a screw auger 16 therein that is driven by any suitable mechanism (not shown). The hopper 10 includes a flexible canvas member having depending end walls 18 and depending side walls 20 all of which merge and form a generally cylindrical bottom portion 22 receiving the end of the pipe 14 which has the usual slidable components 24 to control the inlet opening 26 which is disposed interiorly of the hopper formed by the canvas members. The canvas members are supported by a frame generally designated by numeral 28 by virtue of hems 30 being provided for receiving the upper frame and supporting the canvas hopper in position for receiving grain from a dump body 32 which has the rear end depressed downwardly while the front end is elevated for dropping grain through a slidable door 34 or the like.

The frame includes a rectangular base frame 36 including parallel side rails 38 and parallel end rails 40 all rigidly interconnected with each corner of the base frame 36 having an upwardly opening U-shaped member 42 rigid therewith.

Pivotally connected to a pair of the U-shaped members 42 at one edge of the base frame 36 is a pair of arcuate rods 44 while the other U-shaped members 42 have a pair of arcuate rods 46 connected thereto. The connection is by virtue of a transverse pin 48 which provides for pivotal movement. Also disposed on each of the rods 44 is a thrust washer 50 and a coil compression spring 52.

The other end of the arcuate rods 44 extend through a top frame assembly generally designated by numeral 54 which includes end rails 56 and side rails 58 that are rigidly interconnected. The outer end of one of the rails 56 slidably receives the upper end of the arcuate rods 44 therethrough with the other end of the spring 52 also engaging the lower surface of the rod 56 with there also being a retaining pin 59 in one of a series of longitudinally spaced apertures 57 in the rods 44.

The rods 46 have their upper ends connected with an adapter 60 connecting these rods to the upper frame 54 and the rods 46 also have a coil spring 62 thereon and the entire upper frame is vertically adjustably supported.

Figure 2:
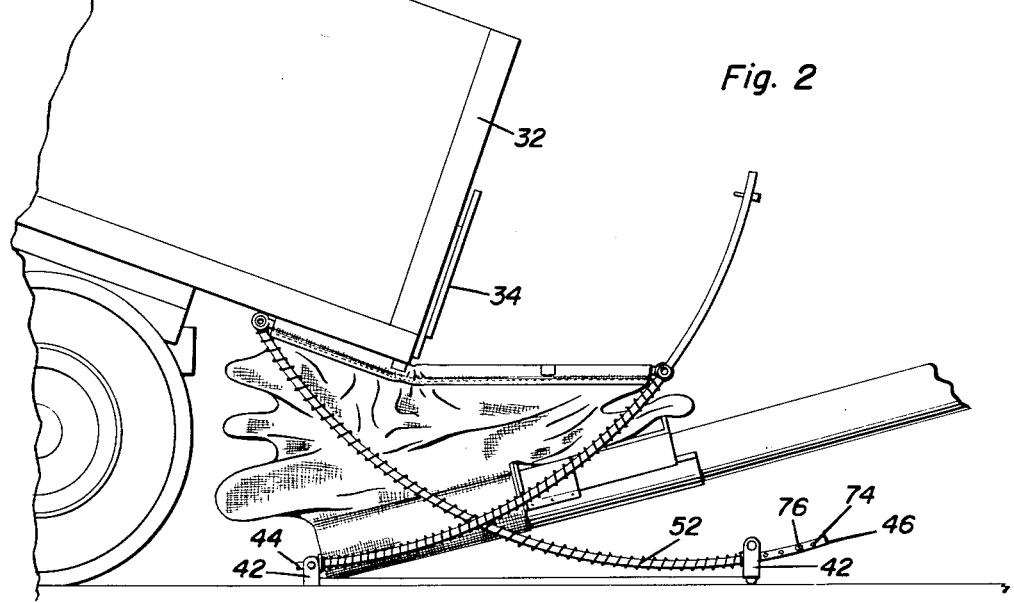
FIGURE 2 is a side elevational view of the hopper illustrating the association thereof with a dump body and illustrating the movement of the hopper when depressed.
Figure 7:
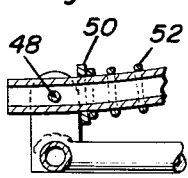
FIGURE 7 is a detailed sectional view taken substantially upon a plane passing along section line 7—7 of FIGURE 1 illustrating the connection between the lower ends of the curved rods and the forward ends of the base frame.
Figure 8:
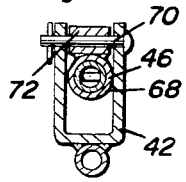
FIGURE 8 is a detailed sectional view taken substantially upon a plane passing along section line 8—8 of FIGURE 1 illustrating further structural details of the invention.
Figure 9:
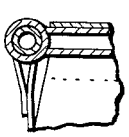
FIGURE 9 is a detailed sectional view illustrating the manner in which the flexible hopper is attached to the frame and taken substantially upon a plane passing along section line 9—9 of FIGURE 1.

Each of the side rails 58 is provided with a built-in coil spring 64 that is secured to the ends of the sections of the rods 58 as illustrated in FIGURE 6 by any suitable means such as spot welding or the like 66. Also, the lower end of each of the rods 46 is slidable in relation to the U-shaped bracket 42 by virtue of a sleeve 68 slidably receiving the tubular rod 46 and also being pivotally attached to the bracket 42 by virtue of a pivot pin 70 extending through a transverse sleeve 72 rigid with the sleeve 68. The brackets 42 at the rear corners of the base frame 36 are slightly longer than the brackets 42 at the forward ends thereof so that the hopper structure may be forced downwardly when the vehicle dump body is pivoted as illustrated in FIGURE 2 at which time the side rails 58 will flex by virtue of the spring 64 and the rear ends thereof will slide downwardly on the rods 44 and the rods 46 will slide downwardly and rearwardly through the sleeve 68. As illustrated the outer end of the rod 46 is provided with a series of apertures 74 one of which may receive a transverse pin 76 for preventing disengagement of the rod 46 from the sleeve 68.

With this construction, the dump body 32 may be pivoted in the usual manner and if the lower rear edge of the dump body engages the top edge of the hopper, no damage will occur but the hopper will only collapse a necessary amount as illustrated in FIGURE 2 and still receive and guide the material into the screw auger conveyor. For stabilizing the rods 58, a pair of transverse stabilizing bars 78 are provided and are secured to the side rails 56 to prevent outward flexing movement thereof whereby only pivotal movement of the rods 58 in relation to the rails 56 is permitted. A roller 79 is provided on one or both bars 78 to prevent hanging or catching on the dump body.

The form of the invention illustrated in FIGURES 10–13 is generally designated by the numeral 80 and includes a base frame generally designated by numeral 82 which includes a front rail 84, side rails 86 and a rear rail 88 all rigidly interconnected with the juncture portion of the rear rail 88 and the side rails 86 having two upwardly opening U-shaped brackets 90 thereon and, as illustrated in FIGURE 13, this bracket includes a transverse supporting pin 92 having a sleeve 94 rotatable thereon together with a second sleeve 96 rigid with and perpendicular to the sleeve 94 for slidably receiving an arcuate rod 98 having a plurality of longitudinally spaced apertures 100 therein. One of the apertures is provided with a transverse pin 102 for preventing outward disengagement of the rod 98 from the sleeve 96. Also provided on the rod 98 is a compression spring 104 which abuts the sleeve 96 and normally urges the rod 98 to an extended position.

Also provided on each of the side rails 86 is a U-shaped bracket 106 supporting a vertical straight rod 108 by virtue of a pivot pin 110. The rod 108 is provided with a compression spring 112 thereon and is also provided with a series of apertures 114 at the upper end thereof adjustably receiving a stop pin 115.

An upper frame including a side and end rod construction is carried by the upper ends of the rods 98 and 108. The upper frame includes side rails 116 having a pivot sleeve 118 connected to the forward end thereof which is rigid with the arcuate rod 98 thereby pivotally supporting the upper frame at the forward ends from the rods 98. The rear end of the frame including the side rod 116 is provided with a sleeve 120 slidably and rotatably mounted on the rods 108 so that the upper frame may move vertically thus causing sliding pivotal movement of the arcuate rod 98 in the sleeve 96 and also causing the sleeve 120 to move downwardly and upwardly on the rod 108 and causing the rod 108 to pivot about the pivot pin 110. The side rods 116 are provided with spring inserts 122 similar to the construction illustrated in FIGURE 6 and also is provided with transverse bars 124 similar to the bars 78.

A canvas hopper is connected to the upper frame by virtue of hem 126 and depending flexible panels 128 which terminate in a generally cylindrical portion 130 connected to a screw auger housing 132. The orientation of this form of the invention to the truck body 134 is clearly illustrated in FIGURE 11 and the manner of connecting the panel hopper to the screw auger housing as illustrated in FIGURE 12.

In each form of the invention, the hopper enables the continued dumping of grain into the screw auger hopper even if the truck body comes into contact with the hopper which would normally damage the hopper but which in this instance does not damage the hopper due to the flexible construction thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hopper construction for auger conveyors comprising a base adapted to rest on a supporting surface, an upper frame spaced from the base, means interconnecting the base and the upper frame for enabling the upper frame to be depressed towards the base upon downward force being exerted thereon by the load body of a vehicle, and a flexible hopper forming means connected to the upper frame and having the lower end adapted to be connected to an auger conveyor for guiding material from a load body into the conveyor and for flexing and holding upon downward movement of the upper frame toward the base thereby assuring guiding movement of the material even though the hopper forming means is partially depressed by the vehicle load body, said means interconnecting the upper frame and the base including at least one pair of upwardly extending rods slidably and pivotally connected to the upper frame and pivotally connected to the base, and spring means urging the upper frame away from the base, said base and upper frame being also connected by guide rods for guiding the vertical movement of the upper frame.

2. A hopper construction for auger conveyors comprising a base adapted to rest on a supporting surface, an upper frame spaced from the base, means interconnecting the base and the upper frame for enabling the upper frame to be depressed towards the base upon downward force being exerted thereon by the load body of a vehicle, and a flexible hopper forming means connected to the upper frame and having the lower end adapted to be connected to an auger conveyor for guiding material from a load body into the conveyor and for flexing and holding downward movement of the upper frame toward the base thereby assuring guiding movement of the material even though the hopper forming means is partially depressed by the vehicle load body, said means interconnecting the upper frame and the base including a pair of arcuate rods at each side of the upper frame and the base, the lower end of certain of said rods being slidably and resiliently connected with the base for permitting downward vertical movement of the upper frame under spring tension whereby the upper frame will normally be forced to a normal condition with the hopper forming means in taut condition.

3. A unitary self-supporting hopper construction for auger conveyors comprising a base adapted to rest on a supporting surface, an upper frame spaced from the base, means interconnecting the base and the upper frame resiliently supporting and retaining the upper frame in spaced relation to the base and enabling the upper frame to be depressed toward the base when a downward force is exerted thereon, and a flexible hopper forming means supported from the upper frame and depending therefrom, said hopper forming means having the lower end adapted to be connected to an auger conveyor for guiding material into the conveyor whereby the hopper forming means will flex and fold upon downward movement of the upper frame toward the base thereby assuring guiding movement of the material into the auger even though the upper frame and the hopper forming means is partially depressed.

4. The structure as defined in claim 3 wherein said upper frame includes a pair of side rails, each side rail including a coil spring forming a portion of a length thereof whereby the side rails may have the coil spring portion thereof depressed downwardly in relation to the other portions thereby accommodating a portion of downward force.

5. The structure as defined in claim 3 wherein said hopper forming means includes a generally tapering receptacle constructed of flexible canvas-like material, the lower end of said receptacle having an adapter connected with one end of a screw auger.

6. The structure as defined in claim 3 wherein said means interconnecting the upper frame and the base includes a plurality of rod members guidingly and movably interconnecting the base and upper frame, and spring members interconnecting the base and upper frame for urging the upper frame away from the base.

References Cited in the file of this patent

UNITED STATES PATENTS 2,754,982    Hoffmeister et al. _____ July 17, 1956

FOREIGN PATENTS 619,539    France _____ Jan. 4, 1927
314,642    Germany _____ Oct. 12, 1918